May 15, 1945.　　　M. L. MUELLER　　　2,376,172
HEATING APPARATUS
Filed June 7, 1941　　　3 Sheets-Sheet 1
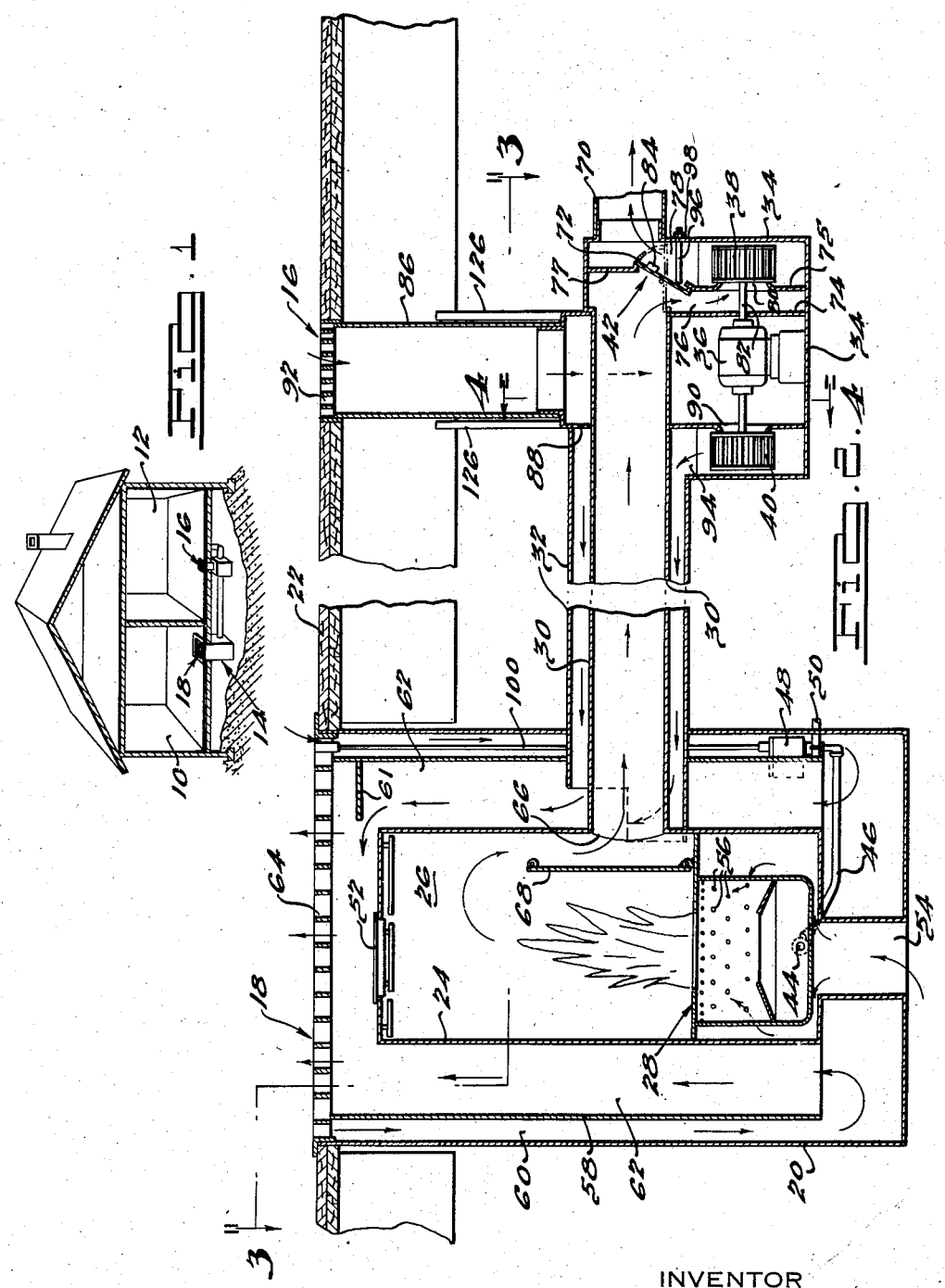
INVENTOR
Moritz L. Mueller.
BY Edwin J. Balluff
ATTORNEY May 15, 1945.                M. L. MUELLER                 2,376,172
                             HEATING APPARATUS
                          Filed June 7, 1941            3 Sheets-Sheet 2
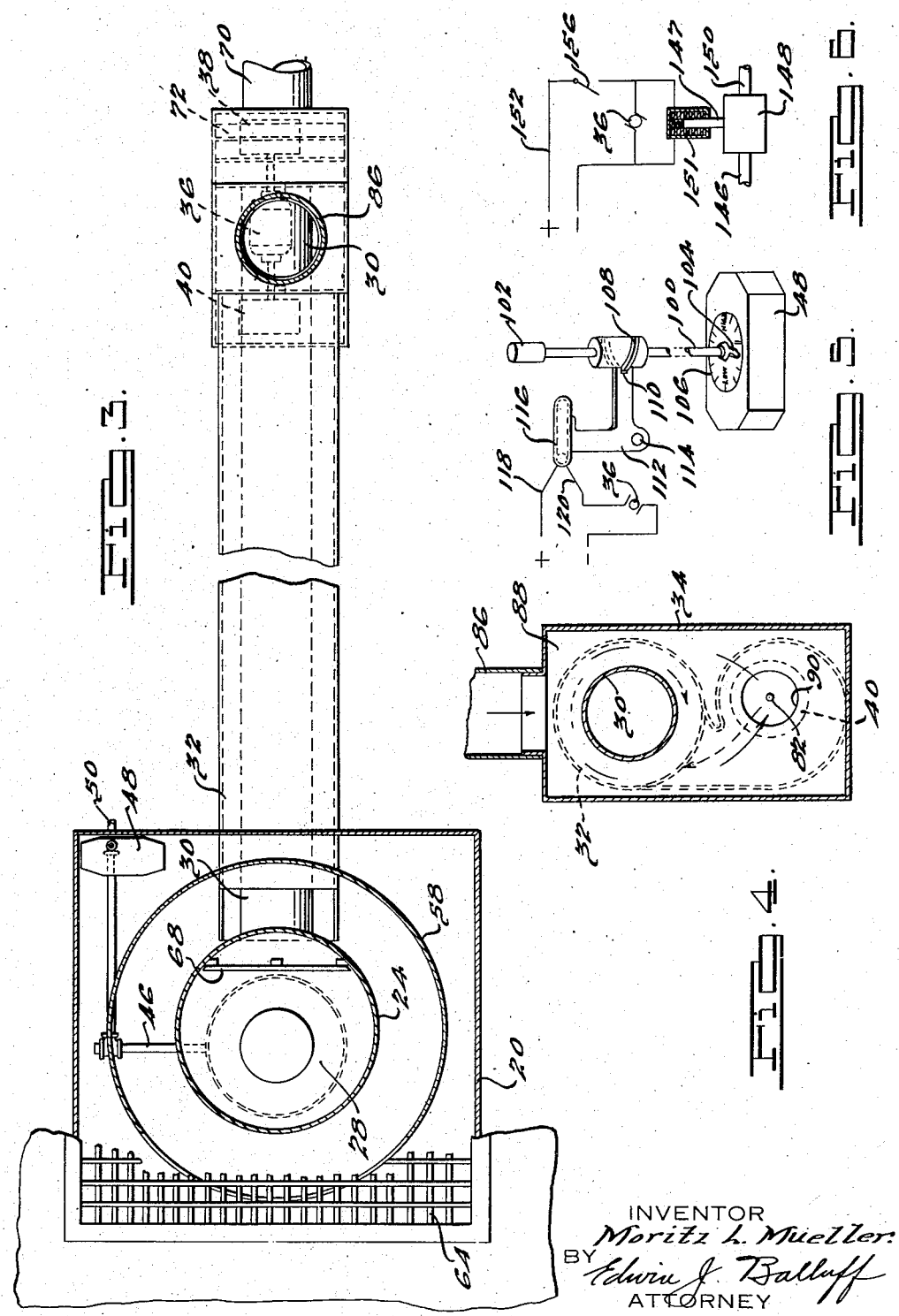

May 15, 1945. M. L. MUELLER 2,376,172
HEATING APPARATUS
Filed June 7, 1941 3 Sheets-Sheet 3
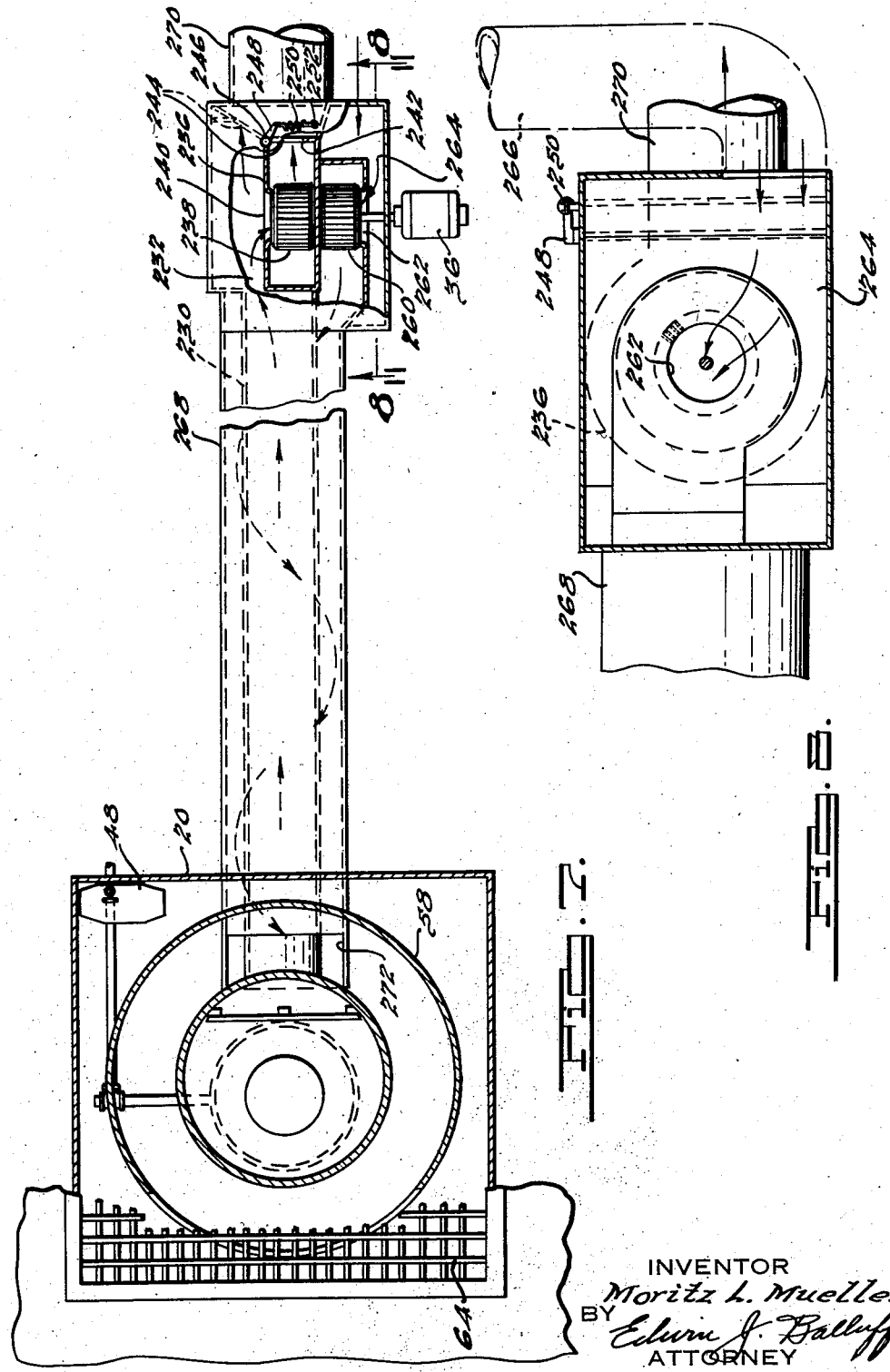
INVENTOR
*Moritz L. Mueller.*
BY *Edwin J. Balluff*
ATTORNEY Patented May 15, 1945

2,376,172

UNITED STATES PATENT OFFICE 2,376,172

HEATING APPARATUS

Moritz L. Mueller, Grosse Pointe, Mich.

Application June 7, 1941, Serial No. 397,055

11 Claims. (Cl. 126—116)

This invention in general relates to heating apparatus and has particular reference to a novel and improved construction for floor furnaces.

Principal objects of the invention are:

To provide a highly efficient form and construction of floor furnace;

To provide a floor furnace construction utilizing an atmospheric type of oil burner with forced draft effecting means therefor and with forced air circulating means therefor;

To provide a novel and improved form of floor furnace which will efficiently burn fuel and recover heat from the flue gases therefrom;

To provide a floor furnace having forced draft effecting means and forced air circulating means which are constructed and aranged so that in the event of power failure during operation of the furnace the same can operate under natural or atmospheric draft conditions and the air to be heated can pass through the furnace due to gravity circulation;

To provide a floor furnace construction which is simple in design and inexpensive to construct and which is constructed and arranged so as to efficiently transfer heat from the flue gases to the air to be heated;

To provide an "automatic" oil burning floor furnace;

To provide a floor furnace in which there is provided a novel and efficient means to circulate air to be heated over heat exchange surfaces of the furnace; to induce an increased flow of air through the furnace over at least a part of the heat exchange surface thereof; and to effect a forced draft of the flue gases from the furnace to the stack;

To provide a very simple and effective means for regulating the draft through a furnace in which forced draft effecting means are provided.

Other objects and advantages of the invention will be apparent from a consideration of the following specification taken in conjunction with the accompanying drawings, of which there are three sheets, and wherein:

Fig. 1 is a diagrammatic view of a part of a dwelling, illustrating the application of a floor furnace embodying the invention thereto;

Fig. 2 is a vertical sectional view along the center line of the furnace;

Fig. 3 is a horizontal sectional view taken along the staggered line 3—3 of Fig. 2, looking in the direction of the arrows;

Fig. 4 is a vertical sectional view taken in a plane along the line 4—4 of Fig. 2, looking in the direction of the arrows;

Fig. 5 is a somewhat diagrammatic view of the controls for the furnace;

Fig. 6 is a somewhat diagrammatic view of a modified form of control for the furnace;

Fig. 7 is a view similar to Fig. 3 showing a modified form of the construction illustrated therein, certain of the parts being broken away; and Fig. 8 is a sectional view taken along the line 8—8 of Fig. 7.

Referring now to Fig. 1, there is illustrated somewhat diagrammatically a house having rooms 10 and 12 and a floor furnace indicated generally at 14 arranged in space below the floor of such rooms. The furnace 14 is provided with an air return indicated generally at 16 in the room 12 and a register indicated generally at 18 in the room 10 providing a hot air discharge into the room 10 and also a return air opening to the furnace 14.

Referring now to Fig. 2, the furnace comprises in general a casing 20 depending from the floor 22 through an opening therein, a drum 24 affording a combustion chamber 26, an oil burner 28, a smoke pipe 30, an air pipe 32, and another casing 34 forming a housing for the motor 36, a flue gas blower 38, an air blower 40, and a damper-controlled by-pass indicated generally at 42.

The drum 24 is arranged inside the casing 20 and has the burner 28 operatively arranged in its lower part. The burner 28, as illustrated, is of the type known as the heat vaporizing or pot type of oil burner and is adapted to be supplied with oil through a port 44 to which an oil supply pipe 46 is connected, the other end of the pipe 46 being connected to an oil regulating valve indicated at 48. The valve 48 is supplied with oil from a reservoir through the conduit 50 and under the control of the valve 48, as herein explained, oil will flow from the reservoir through the conduit 50, valve 48, pipe 46, and port 44 into the bottom of the burner 28. The oil in the bottom of the burner 28 may be ignited manually by applying a light or flame thereto through the opening in the upper wall of the drum which is normally closed by the door 52. The casing 20 is formed to provide an air intake opening 54 so as to admit air into the burner and the combustion chamber 26 to support combustion therein, the air passing through the drum 24 through an opening formed therein below the bottom of the burner 28, thence around the sides of the burner 28 and into the burner through the air intake openings 56 therein. The space within the casing 20 and outside of the drum 24 is divided by an annular shield or baffle 58 so as to provide a return air passageway 60 and a hot air passageway 62. The baffle 58 may, as illustrated, extend from just beneath the grill 64 which is arranged over the opening in the floor in which the furnace is arranged to a point spaced from the bottom of the casing 20 so as to permit the air which flows downwardly through the passageway 60 to pass into the bottom of the passageway 62. In the passageway 62 the air, due to the absorption of heat from the flue gases within the combustion chamber 26 through the metal wall of the drum 24, will flow upwardly and pass through the openings in the register 18 into the room to be heated. The passageways 60 and 62 thus provide a path for the gravity circulation of air to be heated through the furnace and over the heat exchange surface thereof.

The flue gases or products of combustion resulting from the operation of the burner 28 pass through an outlet port 66 into the smoke pipe 30. A baffle 68 may be arranged directly opposite the outlet 66 so as to prevent the products of combustion from passing directly into the smoke pipe 30 before circulating through and around the combustion chamber 26. The other end of the smoke pipe 30 is connected to a pipe or conduit 70 leading to the chimney, and when the valve element 72 of the damper-controlled by-pass 42 is arranged in the position illustrated in dotted lines in Fig. 2, the products of combustion will pass through the smoke pipe 30 directly to the pipe or conduit 70 leading to the chimney under a natural draft circulation.

The damper-controlled by-pass 42 comprises a passageway 76 around the damper 72 when the same is in the full line position shown in Fig. 2. The casing 34 is provided with partitions or wall members 74 and 75 which define within the casing 34 the passageway 76 in which the blower 38 is arranged. One end of the passageway 76 communicates with the interior of the smoke pipe 30 on the left-hand side of the damper-controlled by-pass 42 and the other end 78 of the passageway 76 communicates with the smoke pipe 70 on the right-hand side of the damper-controlled by-pass 42. The partition 75 is formed to provide an intake opening 80 for the flue gas blower 38 which may be of the rotary blower wheel type, and which is constructed and arranged so as to draw flue gases from the pipe 30 through the passageway 76 and intake opening 80 and to discharge the same through the end 78 of the passageway 76 and into the conduit 70 leading to the chimney. Thus, when the blower 38 is operating it will effect a forced draft of the products of combustion from the burner 28 through the combustion chamber 26, smoke pipe 30 and passageway 76 through the conduit 70 to the chimney. The blower 38 may be arranged upon one end of the shaft 82 of the motor 36. The damper 72 is pivotally mounted in the casing 34 in such a manner as to close an opening formed between the upper part of the partition 75 and a baffle 77 depending from the top of the casing 34 when the damper 72 is in the full line position shown in Fig. 2. The damper is provided with a weight 84 which causes the damper to assume the position shown in dotted lines in Fig. 2 when the blower 38 is not operating. In this dotted line position the damper 72 closes the passageway 76 and the products of combustion flow directly from the smoke pipe 30 through the opening between the partitions 75 and 77 and into the conduit 70 leading to the chimney. This circulation of the flue gases is brought about by natural draft conditions under which the burner 28 is set to operate. When the blower 38 begins to operate the suction effect thereof imposed on one side of the damper through the intake opening 80 and passageway 76 and the pressure effect of the air discharged by the blower imposed on that part of the damper 72 which overlies the end 78 of the passageway 76 will shift or move the damper from its dotted line position to the position as shown in full lines in Fig. 2. In this latter position the flue gases then will be drawn by the blower 38 from the combustion chamber 26 through the pipe 30 and passageway 76 into the blower 38 and forced thereby, as previously described, through the conduit 70 to the chimney. When the blower 38 stops the damper 72 will return to the dotted line position shown in Fig. 2 and permit the burner 28 to operate under natural draft conditions.

The air return 16 is connected by a pipe 86 to the interior of the casing 34 at the upper end thereof. A partition 88 arranged within the casing 34 closes the end of the air pipe 32 around the smoke pipe 30 and is formed to provide an air intake 90 for the air blower 40 which is arranged to draw air through the grill 92 which overlies the return air opening 16, through the pipe 86 over that part of the smoke pipe 30 which extends through the casing 34, through the air intake 90 and to discharge such air through the discharge opening 94 into the space between the pipe 30 and 32, the discharge opening 94 being arranged so as to discharge air into such space at one side of the pipe 30 thereby setting up a spiral flow of air inside the pipe 32 and around the pipe 30. The other end of the pipe 32 opens into the casing 20 between the drum 24 and the baffle 58 and air is discharged from this end in such a way as to flow not only over at least some of the outside surface of the drum 24, but also upwardly through the passageway 62, thereby expediting or accelerating the upward flow of air through the passageway 62. Baffle 61, projecting inwardly from baffle 58 serves to deflect air across the top of drum 24 to prevent overheating of the grill 64 directly above the drum 24.

A screw 96, threadedly supported in a nut 98 carried by the wall of the casing 34, is adapted to be advanced or retracted and is engageable with the damper 72 for limiting its counterclockwise movement so as to bleed flue gases, if desired, from the discharge side of the blower 38 to the intake side thereof for the purpose of controlling or varying the maximum forced draft provided by the blower 38. The air blower 40 is mounted upon the other end of the shaft 82 of the motor 36 and hence will be driven simultaneously with the flue gas blower 38. The air which flows responsive to the operation of the blower 40 through the air return 16, duct 86 and pipe 32 will, in passing around the smoke pipe 30, absorb heat from the products of combustion therein through the metal walls of the pipe 30 and the air discharged from the pipe 32, as well as that which returns to the furnace through the air return 60, will flow upwardly through the passageway 62 and be discharged through the grill 64 into the house.

The oil regulating valve 48 which comprises a part of the fuel supplying means for the burner 28 may be provided with a manual control such as is more clearly illustrated in Fig. 5. The valve 48 is of the type which is constructed and arranged so as to pass oil from the reservoir to the bottom of the burner 28 and includes a conventional float control which will shut off the flow of oil when the level thereof in the burner 28 rises to the point for which the control 48 is set. The rate at which the valve 48 will pass oil to the burner 28 may be varied by means of a manual control including a rod 100 provided with a handle 102. When the index finger 104 carried by the rod 100 is set on the position marked "low" on the indicator dial 106 the valve 48 will pass an amount of oil to the burner 28 sufficient to maintain a pilot flame in the burner 28. As the handle 102 is turned so as to move the index finger 104 toward the position marked "high" on the indicator dial 106 the rate of oil flow to the burner 28 will be increased until the finger 104 reaches the position marked "high" on the dial 106 when the valve 48 will be passing an amount of oil sufficient to support a high fire in the burner 28 and combustion chamber 26. Similarly, as the handle 102 is turned in the opposite direction the rate of flow will be reduced until the oil flow is reduced to that sufficient to support a pilot flame or cut off entirely as the case may be.

The valve 48 is of a construction like that now available on the market and the details of construction of the same are not important to the present invention except that the valve should operate as has been explained.

The shaft or rod 100 is provided with a spiral track 108 which cooperates with the forked end 110 of a bracket 112 pivotally mounted at 114. The backet 112 carries a mercury tube switch 116. The contacts inside the mercury tube 116 are connected to the electric wires 118 and 120 which form part of the circuit for supplying current to the motor 36, but when the valve 48 has been adjusted so that the index finger 104 is set on the low position of the dial 106 the bracket 112 cooperating with the track 108 will be tilted so as to break the connection through the switch 116 between the wires 118 and 120 thereby opening the circuit of the motor 36. However, as the fuel supplied to the burner 28 is increased by an adjustment of the valve 48 as previously described, the coaction by the track 108 and the bracket 112 will tilt the mercury switch 116 and close the circuit of the motor 36, thereby energizing the same and driving the blowers 38 and 40. The track 108 and bracket 112 may be arranged so as to close and open the motor circuit in any desired position of the valve 48. Of course, it will be appreciated that when the circuit of the motor 36 is open the burner 28 will operate on a natural draft and the flow of air to be heated through the furnace will be by gravity circulation. However, when the motor 36 is operating the burner 28 will operate under forced draft and the blower 40 will operate to provide forced air circulation through the furnace in addition to the gravity circulation.

In the modified form of construction illustrated in Fig. 6, a valve 148 is connected by a conduit 146 to the burner 28 and by a conduit 150 to the oil reservoir, and preferably is constructed and arranged so that when the movable valve element 147 is in the position illustrated in Fig. 6 the valve 148 will pass from the conduit 150 to the conduit 146 an amount of oil sufficient to provide the maximum combustion desired in the chamber 26. The movable valve element 147 may be connected to the core of a solenoid indicated generally at 151. An electric circuit 152 which has the solenoid operatively included therein also has operatively connected to it the motor 36 and this circuit may be controlled by a room thermostat indicated generally at 156. This circuit is diagrammatically illustrated and is adapted when closed by the thermostatic switch 156 to energize the motor 36 and the solenoid 151 thereby to open the valve 148 to permit the maximum desired flow of oil to the burner 28.

The pot burner 28 which it is contemplated using in the furnace construction disclosed herein is one which today is manufactured and sold primarily to operate under natural draft conditions which, of course, are variable. The flue gas blower 38, as arranged in the construction shown, provides definite, predetermined draft conditions for the burner 28 under which it will operate, but attention is directed to the fact that when the flue gas blower is not operating, which occurs not only when the pot burner is operating on a pilot fire, but also might occur in the event of power failure, that the pot burner 28 is constructed and arranged so that the damper-controlled by-pass 72 will permit the same to operate under natural draft conditions which are those for which the burner 28 is primarily designed.

In the event that the blower 38 stops and the burner 28 is operating above the pilot fire, the same will continue to operate under natural draft conditions and while the forced circulation of air through the heat exchanger 30, 32 will stop, the natural gravity circulation of air over the drum 24 will continue in an unimpaired manner. In connection with the control hookup illustrated in Fig. 6, some means may be provided for manually moving the valve element 147 of the control in the event of power failure.

The induced draft through the burner 28 resulting from the operation of the flue gas blower 38 will not only provide an increased supply of air to the burner to support combustion, but will also facilitate the intermixture of the oil vapor and air which may be burned substantially free from carbonization on the walls exposed to the products of combustion.

The control hookup for the valve for regulating the flow of oil to the burner, as illustrated in Fig. 5 or Fig. 6, may be used. The casing 34 may be suspended from the joists of the building by means of brackets 126.

In the modified form of construction shown in Figs. 7 and 8 the construction and operation thereof is the same as that illustrated in Figs. 2 and 3 except in the following particulars:

A flue gas blower 238 and the scroll or casing 236 therefor are arranged in the smoke pipe 230 at one side thereof, thereby leaving a passageway or bypass 232 which permits the natural draft circulation of flue gases from the pipe 230 to the pipe 270 leading to the stack or chimney. The wall of the blower casing 236 defining part of the passageway 230 is formed to provide an opening 240 which provides an inlet to the blower 238. When the motor 36 which drives the blower 238 is not operating, the discharge outlet 242 from the blower 238 is closed by a damper or valve 244 which is pivotally mounted at 246. An arm 248 affixedly connected to the damper 244 so as to move therewith has one end of a spring 250 connected thereto, the other end of the spring being secured at 252 to a part of the blower casing for positioning the damper 244 in the position indicated in full lines in Fig. 7 so as to close the blower outlet 242 when the motor 36 is not operating.

Upon operation of the motor 36 according to either of the control systems illustrated in Figs.

5 and 6, the flue gases under pressure from the blower 238 will cause the damper 244 to move to the position in which it is shown in dotted lines in Fig. 7 and against the tension of the spring 250. This movement of the damper 244 is also aided by the suction effect of the blower 238 acting through the inlet 240 and the passageway 232. When the damper 244 moves to the dotted line position indicated in Fig. 7 it will block the communication between the passageway 232 and the pipe 270 but the flue gases under the action of the blower 238 will flow under forced draft from the pipe 230 in the passageway 232 and into the blower 238 through the opening 240 and thence be discharged under the pressure of the fan to the outlet 242 into the stack 270. Obviously, as soon as the blower 238 stops operating, the damper 244 will return to the full line position indicated in Fig. 7 thereby permitting the natural draft circulation of the flue gases from the pipe 230 through the passageway 232 to the stack 270.

Another blower 260 is arranged to draw return air through the opening 262 from the passageway 264 which communicates by means of a duct indicated at 266 with the space being heated, the duct 266 corresponding in function to the duct 86 illustrated in Fig. 2. The return air acted upon by the blower 260 is discharged into the space between the pipes 230 and 268, the pipe 268 corresponding in construction and function to the pipe 32 illustrated in Fig. 2. The pipes 230, 268 form a heat exchanger so that the air acted upon by the blower 260 which passes therethrough will extract heat from the flue gases carried by the pipe 230, and such air is discharged into the furnace 20 through the outlet 272 from whence it is conducted back to the space to be heated in a manner similar to that disclosed in Fig. 2.

The pipes 230 and 268 may be made as long as necessary so as to get such stack temperature drop as may be required. Particular attention is directed to the fact that in this modification the flue gases under natural draft will travel in essentially a straight line from the pipe 230 through the passageway 232 to the stack 270 and that the flue gas blower 238 is arranged in the flue gas passageway at one side thereof. The motor 36 which is connected to both the blowers 260 and 238 for driving the same may be arranged in either of the circuits illustrated in Figs. 5 and 6.

The present application constitutes an improvement upon applicant's co-pending application, Serial No. 374,522, filed January 14, 1941, for "Heating apparatus," and while the claims of such application are broadly directed to features common to the two applications, the claims of the present application are limited to features not disclosed in the earlier application.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In a floor furnace having a combustion burner, means defining a path through the furnace for the gravity circulation of air to be heated and including an upwardly extending portion, an element heated by said burner and arranged in said upwardly extending portion in the path of flow of the air to be heated, a flue gas conduit connected with said burner for conducting the flue gases therefrom to a vent, means defining a passageway between said path and space to be heated, at least a part of said conduit being arranged in heat exchange relationship with said passageway, a blower in said passageway for effecting the circulation of air to be heated therethrough, means in said conduit for effecting a forced draft of the flue gases from said burner, a by-pass around said forced draft effecting means and arranged to be open when said forced draft effecting means are inoperative so as to permit natural draft operation of said burner, and an electric motor for simultaneously operating said blower and said forced draft effecting means.

2. In a floor furnace having a combustion burner, means defining a path through the furnace for the gravity circulation of air to be heated and including an upwardly extending portion, an element heated by said burner and arranged in said upwardly extending portion in the path of flow of the air to be heated, a flue gas conduit connected with said burner for conducting the flue gases therefrom to a vent, means defining a passageway between said path and space to be heated, at least a part of said conduit being arranged in heat exchange relationship with said passageway, a blower in said passageway for effecting the circulation of air to be heated therethrough, means in said conduit for effecting a forced draft of the flue gases from said burner, a by-pass around said forced draft effecting means and arranged to be open when said forced draft effecting means are inoperative so as to permit natural draft operation of said burner, an electric motor for simultaneously operating said blower and said forced draft effecting means, means for supplying fuel to said combustion burner, and a circuit for said motor associated with said fuel supplying means in such a manner that the motor is energized when the fuel supply to the burner is increased and de-energized when the fuel supply to the burner is decreased.

3. A furnace including a combustion burner constructed and arranged to operate under natural draft, a conduit for conducting flue gases from said burner to a vent, means defining a path through the furnace for the gravity flow of air to be heated, a heating element associated with said burner and arranged in said path, a passageway extending between a part of said path and space to be heated, at least a portion of said conduit being arranged in heat exchange relationship with said passageway, a blower for circulating air to be heated through said passageway for absorbing heat from the flue gases in said conduit, means for effecting a forced draft of the flue gases through said conduit, a by-pass around said forced draft effecting means and arranged to be open when the same is inoperative so as to permit natural draft operation of said burner, and an electric motor for driving said blower and said forced draft effecting means, said blower when operative being effective for discharging heated air into said path in which said element is arranged.

4. In a floor furnace having a combustion burner, an element adapted to be heated by said burner and a horizontally extending conduit for conducting the flue gases from said burner to a vent, means defining a path through the furnace for the gravity circulation of air to be heated and including an upwardly extending portion in which said element is arranged, said burner being constructed and arranged to operate under natural draft, means for effecting a forced draft of the flue gases through said conduit to the vent, a by-pass around said forced draft means arranged to be open when said forced draft effecting means are inoperative so as to permit natural draft operation of said burner, and means for operating said forced draft effecting means in accordance with the fuel input to said burner.

5. In a floor furnace having a combustion burner, an element adapted to be heated by said burner and a conduit for conducting the flue gases from said burner to a vent, means defining a path through the furnace for the gravity circulation of air to be heated and including an upwardly extending portion in which said element is arranged, said burner being constructed and arranged to operate under natural draft, means for providing a forced draft of the flue gases through said conduit to the vent, a by-pass arranged to be open when said forced draft effecting means are inoperative, means for operating said forced draft effecting means in accordance with the fuel input to said burner, a passageway extending between a part of said path and space to be heated, at least a part of said conduit being arranged in heat exchange relationship with said passageway, and means operative with said forced draft effecting means for circulating air through said passageway.

6. A floor furnace adapted to be suspended below an opening in the floor of a dwelling comprising a casing depending from said floor, a combustion burner arranged in said casing, means defining a path through the opening in the floor and through the furnace for the gravity circulation of air to be heated, an element heated by said burner and arranged in said path, a horizontal flue gas conduit connected with said burner for conducting the flue gases therefrom to a vent, means defining a passageway between said path and space in said dwelling to be heated, at least a part of said conduit being arranged in heat exchange relationship with said passageway, a blower in said passageway for effecting the circulation of air therethrough, a blower in said conduit for effecting a forced draft of the flue gases from said burner, a by-pass around said flue gas blower and arranged to be open when said flue gas blower is inoperative so as to permit natural draft operation of the burner, an electric motor connected to both of said blowers for driving the same, a manually controlled means for varying the rate at which fuel is supplied to said burner, and a circuit for the motor associated with said manually controlled means in such a manner that the motor is energized and deenergized in accordance with the changes in the rate of fuel supply to the burner.

7. For use in connection with a combustion burner an economizer construction comprising a pair of telescopically arranged pipes, one of the pipes being connected at one end thereof to the burner and at the other end thereof to a vent and providing a flue passageway for conducting flue gases from the burner to the vent and the other of the pipes forming a passageway for air to be heated in heat exchange relationship with the flue gases, a pair of blowers co-axially mounted upon a shaft, a motor for driving said shaft and blowers, one of said blowers being operable for circulating air through one of said pipes and the other of said blowers being operative for effecting a forced draft of flue gases from said burner to said vent, said air passageway being disposed on the discharge side of said air blower and said flue passageway being disposed on the suction side of said flue gas blower, and a by-pass around said flue gas blower arranged to be open when said motor is inoperative so as to permit natural draft operations of said burner.

8. In a floor furnace having a combustion burner constructed and arranged to operate under natural draft, means defining a path through the furnace for the gravity circulation of air to be heated, an element heated by said burner and arranged in said path of flow of the air to be heated, a flue gas conduit connected with said burner for conducting the flue gases therefrom to a vent, means defining a passageway for the flow of air to be heated between said path and space to be heated, at least a substantial part of said conduit being arranged in heat exchange relationship with said passageway, means for effecting a forced circulation of air to be heated through said passageway, means operable with said air circulating means for effecting a forced draft of the flue gases from said burner, a by-pass around said forced draft effecting means and arranged to be open when said forced draft effecting means are inoperative so as to permit natural draft operation of said burner, and means for varying the rate of fuel supply to said burner, said air circulating and forced draft effecting means being constructed and arranged and associated with said fuel supply varying means in such a manner that they are normally rendered operative and inoperative in accordance with changes in the rate of fuel supply to said burner.

9. In a floor furnace having a combustion burner constructed and arranged to operate under natural draft, means defining a path through the furnace for the gravity circulation of air to be heated, an element heated by said burner and arranged in said path of flow of the air to be heated, a flue gas conduit connected with said burner for conducting the flue gases therefrom to a vent, means defining a passageway between said path and space to be heated, at least a part of said conduit being arranged in heat exchange relationship with said passageway, a blower in said passageway for effecting the circulation of air to be heated therethrough, means in said conduit for effecting a forced draft of the flue gases from said burner, a by-pass around said forced draft effecting means and arranged to be open when said forced draft effecting means are inoperative so as to permit natural draft operation of said burner, an electric motor for simultaneously operating said blower and said forced draft effecting means, means for varying the supply of fuel to said combustion burner, and a manually controlled circuit for said motor associated with said fuel supply varying means in such a manner that the motor is energized when the fuel supply to the burner is increased and deenergized when the fuel supply to the burner is decreased.

10. In a floor furnace having a combustion burner constructed and arranged to operate under natural draft, means defining a path through the furnace for the gravity circulation of air to be heated, an element heated by said burner and arranged in said path of flow of the air to be heated, a flue gas conduit connected with said burner for conducting the flue gases therefrom to a vent, means defining a passageway between said path and space to be heated, at least a part of said conduit being arranged in heat exchange relationship with said passageway, a blower in said passageway for effecting the circulation of air to be heated therethrough, means in said conduit for effecting a forced draft of the flue gases from said burner, a by-pass around said forced draft effecting means and arranged to be open when said forced draft effecting means are inoperative so as to permit natural draft operation of said burner, an electric motor for simultaneously operating said blower and said forced draft effecting means, means for varying the supply of fuel to said combustion burner, and a thermostatically controlled circuit for said motor associated with said fuel supply varying means in such a manner that the motor is energized when the fuel supply to the burner is increased and deenergized when the fuel supply to the burner is decreased.

11. A furnace including a combustion burner constructed and arranged to operate under natural draft, a conduit for conducting flue gases from said burner to a vent, means defining a path through the furnace for the gravity flow of air to be heated, a heating element associated with said burner and arranged in said path, a passageway extending between a part of said path and space to be heated, at least a portion of said conduit being arranged in heat exchange relationship with said passageway, a blower for circulating air from said space to be heated through said passageway to said path for absorbing heat from the flue gases in said conduit, a blower for effecting a forced draft of the flue gases through said conduit, a by-pass around said flue gas blower and arranged to be open when the same is inoperative so as to permit natural draft operation of said burner, an electric motor for driving said blowers, and a circuit for said motor arranged to be opened and closed in accordance with changes in the rate of fuel input to said burner.

MORITZ L. MUELLER.